United States Patent
Moore et al.

(10) Patent No.: US 9,429,202 B2
(45) Date of Patent: Aug. 30, 2016

(54) CERAMIC PREFORM AND METHOD

(71) Applicant: Intellectual Property Holdings, LLC, Cleveland, OH (US)

(72) Inventors: Dan T. Moore, Cleveland Heights, OH (US); Brian Backus, Albany, IN (US); Evelyn M. DeLiso, Corning, NY (US); Joseph B. Richey, III, Chagrin Falls, OH (US)

(73) Assignee: Intellectuall Property Holdings LLC, Cleveland, OH (US)

( * ) Notice: Subject to any disclaimer, the term of this patent is extended or adjusted under 35 U.S.C. 154(b) by 204 days.

(21) Appl. No.: 13/886,113

(22) Filed: May 2, 2013

(65) Prior Publication Data

US 2013/0295304 A1   Nov. 7, 2013

Related U.S. Application Data

(60) Provisional application No. 61/641,561, filed on May 2, 2012.

(51) Int. Cl.
*F16D 65/10*   (2006.01)
*F16D 65/12*   (2006.01)

(52) U.S. Cl.
CPC ............. *F16D 65/10* (2013.01); *F16D 65/125* (2013.01); *F16D 2200/00* (2013.01); *F16D 2200/0047* (2013.01); *Y10T 428/131* (2015.01); *Y10T 428/1317* (2015.01)

(58) Field of Classification Search
CPC .................. F16D 65/10; F16D 65/125; F16D 2200/0047; F16D 2200/00; Y10T 428/131

USPC .............. 264/262, 271.1, 259, 261; 428/34.4, 428/34.6
See application file for complete search history.

(56) References Cited

U.S. PATENT DOCUMENTS 3,286,974 A * 11/1966 Dean et al. ..................... 249/141
3,305,618 A *  2/1967 Sucher .................. B29D 19/00
                                                    264/313

(Continued)

FOREIGN PATENT DOCUMENTS

JP    H02194132    7/1990
JP    H0344432     2/1991

(Continued)

OTHER PUBLICATIONS

Dlouhy, A., et al., "Short Fibre Reinforced MMC/Kurzfaserverstarkter . . . A Quantitative Metallographic Study . . . ," Prakt. Metallogr., vol. 30, pp. 172-185, 1993.

(Continued)

*Primary Examiner* — Nahida Sultana
(74) *Attorney, Agent, or Firm* — Calfee, Halter & Griswold LLP

(57) ABSTRACT

The present application discloses a ceramic preform, a method of making a ceramic preform and a metal matrix composite comprising a ceramic preform. In one exemplary embodiment, the ceramic preform comprises a ceramic compound compressed into the shape of a cylinder by rotational compression molding. The cylinder has an inner surface and an outer surface. A first liner may be attached to the inner surface of the cylinder and a second liner may attached to the outer surface of the cylinder. The metal matrix composite of the present application may be formed as a brake drum or a brake disc.

17 Claims, 11 Drawing Sheets

(56) References Cited

U.S. PATENT DOCUMENTS

| | | | |
|---|---|---|---|
| 3,919,382 A * | 11/1975 | Smarook | B29C 55/02 |
| | | | 264/164 |
| 3,933,335 A | 1/1976 | Maruyama et al. | |
| 4,039,703 A * | 8/1977 | Kamijo | B01D 59/14 |
| | | | 264/112 |
| 4,587,707 A | 5/1986 | Nishida et al. | |
| 4,830,932 A | 5/1989 | Donomoto et al. | |
| 4,871,008 A | 10/1989 | Dwivedi et al. | |
| 4,998,578 A * | 3/1991 | Dwivedi | C04B 35/111 |
| | | | 164/6 |
| 5,024,795 A * | 6/1991 | Kennedy | C04B 35/652 |
| | | | 264/82 |
| 5,167,271 A * | 12/1992 | Lange et al. | 164/103 |
| 5,234,045 A | 8/1993 | Cisko | |
| 5,268,339 A * | 12/1993 | Aghajanian | C04B 35/652 |
| | | | 264/332 |
| 5,350,004 A * | 9/1994 | Rocazella | C04B 41/009 |
| | | | 164/102 |
| 5,413,194 A | 5/1995 | Kulis, Jr. et al. | |
| 5,511,603 A | 4/1996 | Brown et al. | |
| 5,529,620 A | 6/1996 | Corbett et al. | |
| 5,535,857 A | 7/1996 | Barlow | |
| 5,620,791 A | 4/1997 | Dwivedi et al. | |
| 5,698,240 A | 12/1997 | Haguchi | |
| 5,738,818 A | 4/1998 | Atmur et al. | |
| 5,743,983 A * | 4/1998 | Ogata | B31F 1/0077 |
| | | | 156/214 |
| 5,958,551 A * | 9/1999 | Garcia-Ochoa | B32B 3/10 |
| | | | 428/137 |
| 6,062,351 A | 5/2000 | Strasser et al. | |
| 6,180,258 B1 | 1/2001 | Klier | |
| 6,193,915 B1 | 2/2001 | Lo et al. | |
| 6,309,743 B1 | 10/2001 | Fujita | |
| 6,358,628 B1 | 3/2002 | Kajikawa et al. | |
| 6,383,656 B1 * | 5/2002 | Kimura et al. | 428/539.5 |
| 6,544,636 B1 | 4/2003 | Fukunaga et al. | |
| 6,601,284 B1 * | 8/2003 | Wall | B22D 19/00 |
| | | | 29/527.5 |
| 6,662,852 B2 | 12/2003 | Gegel | |
| 6,752,709 B1 | 6/2004 | Skibo et al. | |
| 7,459,110 B2 * | 12/2008 | Lenke et al. | 264/112 |
| 7,793,703 B2 | 9/2010 | Wood et al. | |
| 8,016,018 B2 | 9/2011 | Wood et al. | |
| 8,075,827 B2 | 12/2011 | Loukus et al. | |
| 8,153,541 B2 | 4/2012 | McCullough et al. | |
| 8,455,379 B2 | 6/2013 | McCullough et al. | |
| 8,550,145 B2 | 10/2013 | Wood et al. | |
| 2001/0025751 A1 | 10/2001 | Gruber et al. | |
| 2002/0025356 A1 | 2/2002 | Ingram | |
| 2002/0088599 A1 | 7/2002 | Davis et al. | |
| 2002/0117286 A1 | 8/2002 | Fujita | |
| 2003/0038001 A1 | 2/2003 | Yamaguchi et al. | |
| 2003/0159896 A1 | 8/2003 | Koizumi et al. | |
| 2004/0094285 A1 | 5/2004 | Yamaguchi et al. | |
| 2004/0118547 A1 | 6/2004 | Brown et al. | |
| 2004/0177609 A1 | 9/2004 | Moore, III et al. | |
| 2005/0167214 A1 | 8/2005 | Yamamoto et al. | |
| 2005/0181193 A1 * | 8/2005 | Lenke | B32B 18/00 |
| | | | 428/293.4 |
| 2005/0183909 A1 | 8/2005 | Rau, III et al. | |
| 2005/0184421 A1 * | 8/2005 | de Nagybaczon | C08J 3/203 |
| | | | 264/68 |
| 2005/0217950 A1 | 10/2005 | Jolley, Jr. et al. | |
| 2006/0085968 A1 | 4/2006 | Yamaguchi et al. | |
| 2007/0172639 A1 * | 7/2007 | Kmetz | B32B 18/00 |
| | | | 428/311.11 |
| 2007/0234929 A1 | 10/2007 | Reinsch et al. | |
| 2008/0258343 A1 * | 10/2008 | Tado | B30B 11/08 |
| | | | 264/338 |
| 2009/0165924 A1 | 7/2009 | Steibel et al. | |
| 2009/0309252 A1 | 12/2009 | Schuetz et al. | |
| 2009/0311541 A1 | 12/2009 | Wood et al. | |
| 2009/0312174 A1 | 12/2009 | McCullough et al. | |
| 2010/0000831 A1 * | 1/2010 | Faria | C04B 35/522 |
| | | | 188/251 A |
| 2010/0001231 A1 | 1/2010 | Loukus et al. | |
| 2010/0152015 A1 | 6/2010 | Staudenecker et al. | |
| 2011/0003680 A1 | 1/2011 | Lindemann et al. | |
| 2011/0061830 A1 | 3/2011 | Wood et al. | |
| 2012/0080277 A1 | 4/2012 | Wood et al. | |
| 2012/0227624 A1 | 9/2012 | Loukus et al. | |
| 2012/0295784 A1 | 11/2012 | McCullough et al. | |
| 2013/0015607 A1 * | 1/2013 | Ueda | B29C 43/08 |
| | | | 264/331.11 |
| 2013/0087420 A1 | 4/2013 | Fraley et al. | |
| 2014/0008893 A1 | 1/2014 | Loukus et al. | |
| 2014/0272451 A1 | 9/2014 | Loukus et al. | |

FOREIGN PATENT DOCUMENTS

| | | |
|---|---|---|
| WO | 9911448 | 3/1999 |
| WO | 9932418 | 7/1999 |
| WO | 2005087575 | 9/2005 |
| WO | 2007033378 | 3/2007 |
| WO | 2009154728 | 12/2009 |
| WO | 2009154734 | 12/2009 |
| WO | 2012076154 | 6/2012 |

OTHER PUBLICATIONS

Mukerji, J., "Ceramic Matrix Composites," Defence Science Journal, vol. 43, No. 4, pp. 385-395, Oct. 1993.

KS Aluminium-Technologie AG Brochure, "High-Pressure Die Cast and Squeeze Cast Engine . . . ," 6 pages. www.kspg.com/en/divisions/hardparts/ks-aluminium-technologie/ (Date unknown.).

Everwin, P., et al., "Porsche Boxster, Lokasil®—Zylinderlaufflächen: Eine neue Verbundwerkstoff-Lösung geht mit dem Porsche Boxster in Serie," ATZ. Automobiltechnische Zeitschrift, pp. 66-69, 1996 (in German).

Non-Certified English Translation of Everwin, P., et al., "Porsche Boxster, Lokasil®—Zylinderlaufflächen: Eine neue Verbundwerkstoff-Lösung geht mit dem Porsche Boxster in Serie," ATZ. Automobiltechnische Zeitschrift, pp. 66-69, 1996 Reference. Prepared by Viami International Inc.

Long, S. et al., "Processing of Al-based MMCs by Indirect Squeeze Infiltration of Ceramic Preforms . . . ," pp. 1-23, Jun. 1999.

Evans, A., et al., "Metal Matrix Composites in Industry: An Introduction and a Survey," Kluwer Academic Publishers, p. 241, 2003.

Lenke, Ilka T., et al., "Design of metal ceramic composites," Int. J. Mat. Res., vol. 97, Issue 5, pp. 676-680, 2006.

Dobrzanski, L.A., "Fabrication of ceramic preforms based on . . . ," Journal of Achievements in Materials and Manufacturing Engineering, vol. 18, Issue 1-2, pp. 71-74, Sep.-Oct. 2006.

Dobrzanski, L.A., "Influence of reinforcement shape on the structure and properties of . . . ," 11th Int'l. Research/Expert Conference, "Trends in the Development of Machinery and Associated Technology," TMT 2007, Hammamet, Tunisia, pp. 1479-1482, Sep. 5-9, 2007.

Unifrax Product Information Sheet, "Fiberfrax Ceramic Fiber Paper," Unifrax I LLC, 4 pages, 2009. www.unifrax.com.

International Search Report and Written Opinion from PCT/US2013/039247, dated Aug. 16, 2013.

Light-Weighting Technology™ by Century, Inc., 2 pages, www.light-weighting.com (Date unknown.).

International Search Report and Written Opinion from International Application No. PCT/US2014/64624 dated Aug. 11, 2015.

* cited by examiner

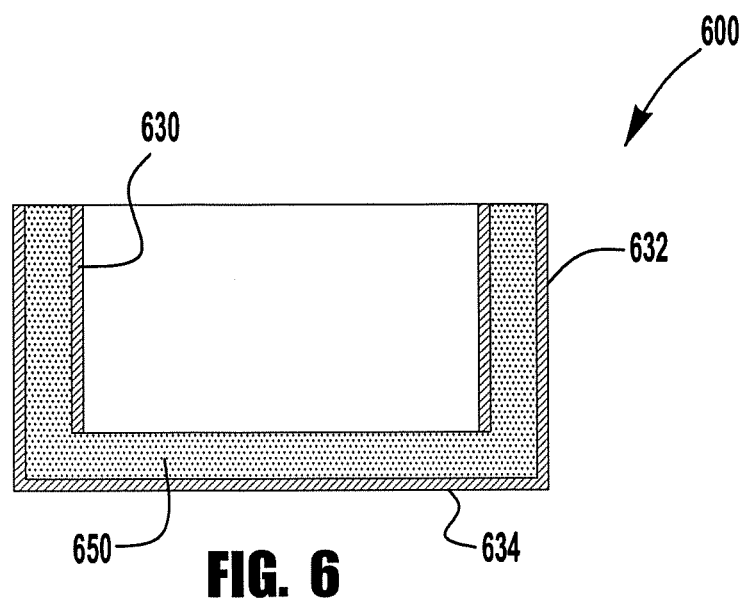
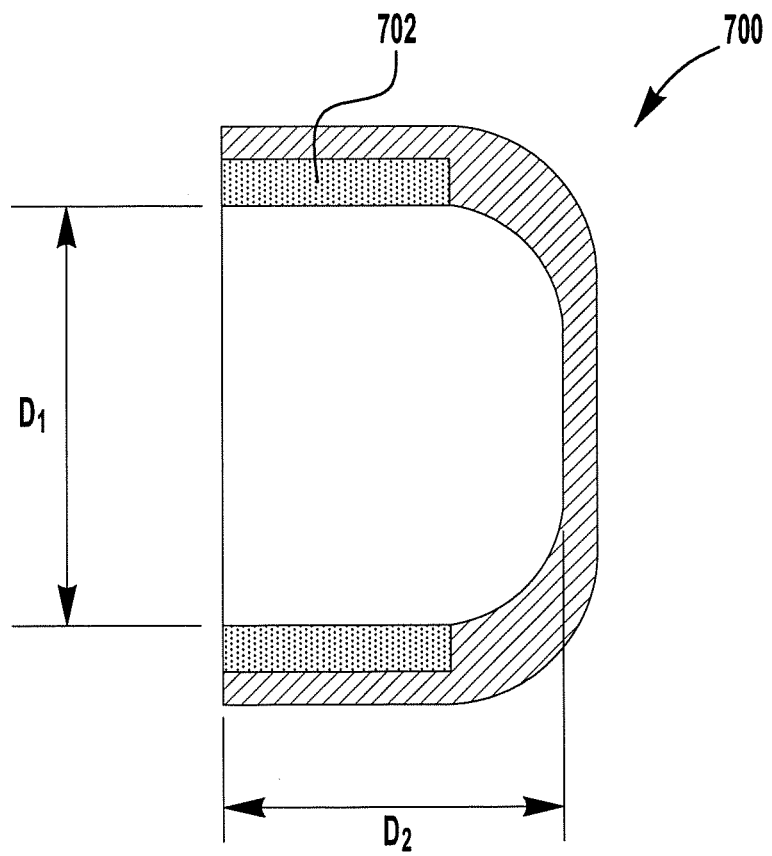

US 9,429,202 B2

CERAMIC PREFORM AND METHOD

CROSS REFERENCE TO RELATED APPLICATION

This application is a U.S. Non-Provisional patent application which claims priority to U.S. Provisional Patent Application No. 61/641,561, filed on May 2, 2012 and titled "Method for Making a Ceramic Preform," which is hereby incorporated by reference in its entirety.

BACKGROUND

A metal matrix composite (MMC) is generally made by incorporating a reinforcing material into a metal matrix. For example, a MMC may comprise a ceramic preform that is infiltrated with a metal. A MMC generally has properties and physical characteristics different from metal that may be desirable depending on the application. One method of making a ceramic preform for a MMC involves extruding a ceramic composition to form the ceramic preform. However, this method of making a ceramic preform does not lend itself to high volume manufacturing.

Vehicles may include drum brakes and/or disc brakes. A drum brake generally comprises a rotating drum-shaped part called a brake drum. Shoes or pads of the drum brake press against the interior surface of the brake drum to cause friction and reduce the rotation of the brake drum. A disc brake generally comprises a rotating brake disc or rotor. Calipers having brake pads that squeeze the exterior and interior of the brake disc to cause friction and reduce the rotation of the brake disc. During the vehicle braking process there is often a high energy transfer to the frictional surface of the brake drum or brake disc which can lead to a rise in temperature, sometimes as high as 700 degrees C. for heavy vehicles such as large trucks or military vehicles.

SUMMARY

The present application discloses a ceramic preform, a method of making a ceramic preform, an apparatus for making a ceramic preform, a MMC comprising a ceramic preform, and a method of making a MMC.

In certain embodiments, the ceramic preform comprises a ceramic compound compressed into the shape of a cylinder by rotational compression molding. The cylinder has an inner surface and an outer surface. A first liner is attached to the inner surface of the cylinder and a second liner is attached to the outer surface of the cylinder. In certain embodiments, the metal matrix composite comprises a ceramic preform formed in the shape of a cylinder by rotational compression molding and infiltrated with a molten metal. The metal matrix composite may be formed as a brake drum and the ceramic preform may form at least a portion of a braking surface of the brake drum. The metal matrix composite may also be formed as a brake disc and the ceramic preform may form at least a portion of a braking surface of the brake disc.

In certain embodiments, the method of making a ceramic preform comprises utilizing a compression molding apparatus having a first die portion and a second die portion. One or more porous and/or absorbent liners are placed on at least one surface of the first die portion and the second die portion. The one or more liners generally adhere to the ceramic preform instead of to the mold surface, facilitating removal of the preform from the mold. The absorbency of the liner, which may be a cardboard core in certain embodiments, helps to draw the moisture from the preform before burning the organics out of the preform. A ceramic compound is placed in the second die portion. The ceramic compound is compressed with the first die portion to form a ceramic preform. When the ceramic preform is removed from the compression molding apparatus, the one or more liners are attached to one or more surfaces of the ceramic preform. In certain embodiments, the one or more porous and/or absorbent liners comprise a first liner and a second liner, the first die portion is a male die portion, and the second die portion is a female die portion. Further, the first liner is shaped as a cylindrical tube and disposed about one end of the male die portion and the second liner is shaped as a cylindrical tube and received within the female die portion. When the ceramic preform is removed from the compression molding apparatus, the first liner is attached to an inner diameter surface of the ceramic preform and the second liner is attached to an outer diameter surface of the ceramic preform.

In certain embodiments, the method of making a ceramic preform comprises utilizing a compression molding apparatus having a first die portion and a second die portion. A ceramic compound is placed in the second die portion and compressed with the first die portion to form a ceramic preform. The first die portion is rotating about its longitudinal axis and relative to the second die portion during compression of the ceramic compound. The ceramic preform is removed from the compression molding apparatus.

These and additional embodiments will become apparent in the course of the following detailed description.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of the inventions.

FIG. 6 is a cross sectional view of a ceramic preform according to an embodiment of the present application.

FIG. 7 is a cross sectional view of a metal matrix composite brake drum according to an embodiment of the present application.

DESCRIPTION OF EMBODIMENTS

The present application discloses a ceramic preform, a method of making a ceramic preform, an apparatus for making a ceramic preform, a MMC comprising a ceramic preform, and a method of making a MMC. The MMC of the present application is generally less dense, lighter, stronger at higher temperatures and provides higher wear resistance than certain metal, non-composite materials. For example, an aluminum MMC of the present application generally has greater wear resistance and stiffness (i.e., resistance to deformation) than cast iron. As such, the MMC of the present application is useful in applications where high wear resistance and strength is beneficial.

The MMC of the present application may be formed as a brake drum, brake disc or rotor, or any component thereof for a vehicle. For example, the ceramic preform of the present application may be infiltrated with a metal, such as, for example, aluminum, magnesium, titanium, or copper, and form at least a portion of a brake drum or brake disc or rotor. In particular, the MMC of the present application generally forms at least a portion of the braking surface of the brake drum or brake disc. The braking surface for the brake drum is generally located on the interior surface of the brake drum that contacts the shoes or pads of the drum brake. The braking surface for the disc brake is generally located on the surfaces of the brake disc that contact the brake pads. The brake drum or brake disc of the present application may be used for virtually any vehicle, including but not limited to, aircraft, trucks, vans, cars, military vehicles, construction vehicles, motorcycles, SUVs, ATVs, and XUVs. However, the MMC of the present application may be formed as a variety of other items, such as, for example, bearings, pistons, cylinder liners, piston rings, connecting rods, aerospace components, armor, or the like.

The MMC brake drums and brake discs of the present application generally have greater wear resistance and less weight than a conventional cast iron brake drums or brake discs. One exemplary method of making a MMC brake drum or brake disc is to insert a ceramic preform of the present application into a high pressure die casting machine. Molten metal (e.g., aluminum) is then injected under high pressure into the die. The molten metal will infiltrate the porous and/or absorbent ceramic preform and fill the die to produce the MMC brake drum. One difficulty found in conventional MMC brake drum manufacturing processes is developing a preform with enough strength (e.g., hoop strength) such that it doesn't break during the handling process, the machining process or when the high pressure molten metal is injected filling the preform and the die. The methods and apparatuses for forming a ceramic preform described in the present application produce a part that is stronger and more dimensionally stable than ceramic preforms made by conventional processes.

Figure 1:
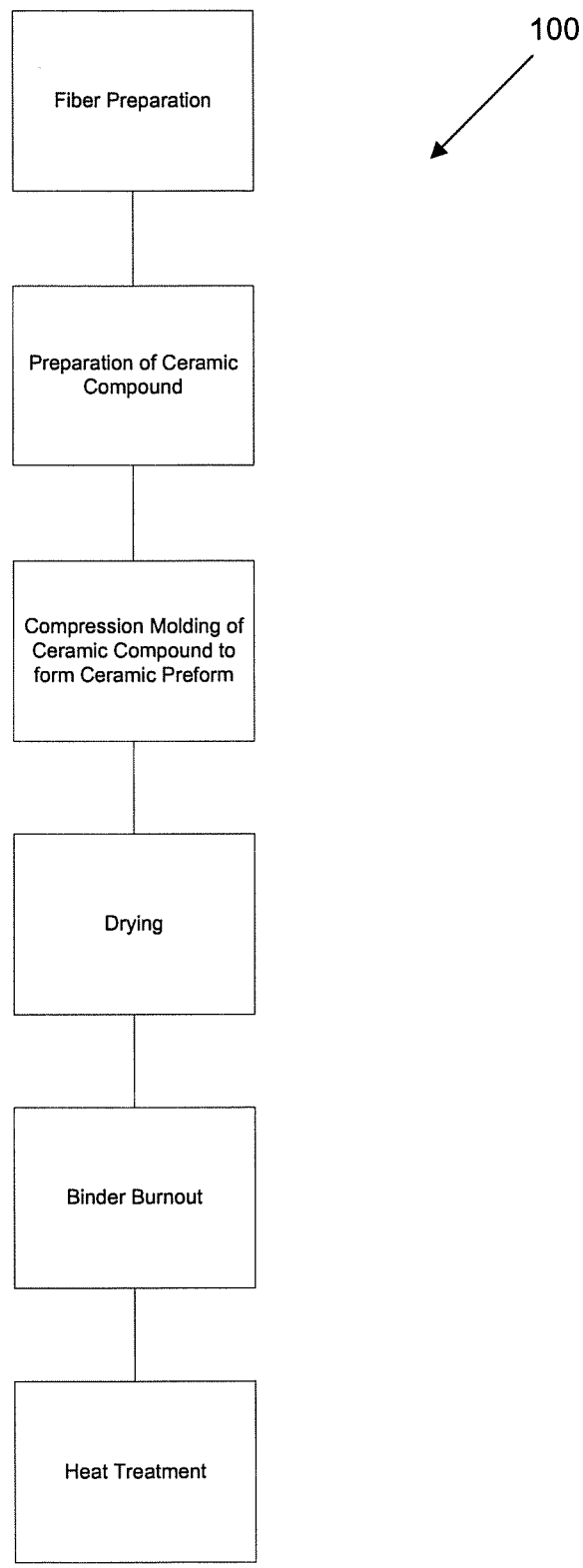
FIG. 1 illustrates a method of making a ceramic preform according to an embodiment of the present application.

FIG. 1 illustrates an exemplary method 100 of making a ceramic preform according to an embodiment of the present application. As shown, the method 100 comprises the steps of fiber preparation, preparation of a ceramic compound, compression molding of the ceramic compound to form a ceramic preform, drying, heat treatment for binder burnout, and heat treatment for inorganic binder setting. These steps are described in greater detail below.

The ceramic compound used to make the ceramic preform of the present application may comprise ceramic particles, reinforcing fiber, fugitive porosity-generating component, starch, organic low temperature binder, colloidal silica suspension, and water. The table below shows typical weight percentage ranges for each component of the ceramic compound according to an embodiment of the present application.

| Component | Weight Percentage, Wt % |
| --- | --- |
| Ceramic Particles | 20 to 55 |
| Reinforcing Fibers | 4.5 to 15 |
| Fugitive porosity-generating component | 2.5 to 8 |
| Starch | 1 to 6 |
| Low temperature organic binder | 1 to 2.5 |
| Colloidal silica | 3.5 to 6.5 |
| Water | 15 to 65 |

The ceramic particles of the compound typically provide the ceramic preform with wear resistance and hardness. The ceramic particles may comprise a variety of materials, such as, for example, silicon carbide, alumina, boron carbide, or combinations or mixtures thereof. In certain embodiments, the ceramic particles comprise silicon carbide particles, 360 grit.

The reinforcing fiber or whisker of the ceramic compound may include short or long fibers and may comprise a variety of materials, such as, for example, carbon, silicon carbide, metallic, or ceramic fibers, whiskers, or chopped filaments. The carbon fiber may be in the form of chopped carbon tape or carbon nanotubes. In certain embodiments, the reinforcing fiber of the ceramic compound is an aluminosilicate, aluminosilica-zirconate, aluminosilica-chromate, or high purity alumina polycrystalline fiber.

The reinforcing fiber of the ceramic compound may be prepared prior to introducing the fiber into the batch of ceramic compound components (see Fiber Preparation step in FIG. 1). For example, when an aluminosilicate refractory fiber is used as the reinforcing fiber, the fiber may be prepared prior to introducing the fiber into the batch. The aluminosilicate refractory fiber is spun from an electrically melted aluminosilicate glass. The fiber is often received from the manufacturer interlocked together in clumps (e.g., a clumped matted bail of refractory fiber) and including shot glass beads left over from the melt spinning process. At least some pretreatment of the fiber may be needed before introducing the fiber in to the batch. For example, the fiber may be separated and sieved to remove the shot. Further, because the refractory fiber is generally a brittle material, the fiber bundles or clumps can be broken apart by pressing on the bundle or by a sharp impact such as from a hammermill.

In one exemplary embodiment, aluminosilicate refractory fiber was hammermilled and sieved such that the clumps of the fiber were less than about 6 mm in length and included less shot than the bulk fiber product after spinning. The fiber clumps were then pressed to further break down the clumps. The pressed fiber was then screened (e.g., through a 500 micron wire mesh screen) to remove loose shot (e.g., shot having a diameter greater than 500 microns). The fiber left on top of the screen was then added to the batch of ceramic compound components. The inclusion of this fiber in the ceramic compound resulted in a desirable microstructure in the MMC after infiltration of the ceramic preform with a molten metal alloy, e.g., aluminum, magnesium, titanium, copper, or any other metal discussed herein.

In certain embodiments, the reinforcing fiber or fibers may be prepared for inclusion into the ceramic compound batch by using a wire brush or other device to gently brush off the fiber from a mat of fiber or ceramic fiber paper (see Fiber Preparation step in FIG. 1). A variety of fiber mats or ceramic fiber paper may be used. For example, in one exemplary embodiment, Fiberfrax Ceramic Fiber 970J is used having a thickness of about ⅛ inch, a density of about 10 lbs/ft$^3$, a fiber index of about 70% by weight, and an LOI including binder of 7.0. This technique permits the fiber to be directly added to the compound batch as it is mixing and reduces the tendency of the fibers to agglomerate. Further, with this approach, most of the shot that is attached to the fiber has been screened out during the paper or mat making process. This process also permits the inclusion of fibers having a longer aspect ratio and, depending on the fibers used, can have an advantage.

In order for the ceramic preform to be infiltrated with molten metal, it is advantageous to have high interconnected porosity which creates a continuous pathway for the molten metal. The fugitive porosity-generating component of the ceramic compound permits the ceramic preform to have a high interconnected porosity. For example, in certain embodiments, the porosity-generating component is a carbonaceous material that will burnout of the molded ceramic article during heat treatment (see, e.g., Binder Burnout and Heat Treatment steps in FIG. 1). Exemplary carbonaceous materials include, but are not limited to, graphite, carbon black, graphene or organic materials with a high carbon content such as, for example, walnut shell flour, pecan shell flour, rice hulls, and saw dust.

In certain embodiments, the low temperature organic binder of the ceramic preform compound is methyl cellulose. When methyl cellulose is used, it is generally heat activated. Further, other binders that may be used include guar gum and Xanthum gum. After molding of the ceramic compound and exposure to a temperature between about 49 and 60 degrees C. (or between about 120 and 140 degrees F.), the ceramic preform develops green strength which maintains its shape during handling.

The colloidal silica solution of the ceramic compound is generally flocced with a starch, such as, for example, a cationic corn starch, to provide a high temperature bonding system in the ceramic preform. For example, in certain embodiments, the colloidal silica solution includes colloidal silica particles having a negative surface charge. A cationic starch is positively charged such that there is electrostatic attraction for flocculation to occur. This flocced bonding system is used to bond the refractory fibers of the ceramic compound and contributes to the formation of a cylindrical ceramic preform with a certain wall thickness. The effects of the flocculation are noticeable with a highly loaded ceramic body and a minimum amount of water present (e.g., between about 15 and 40 wt % water). As discussed in greater detail below, adding a first water amount followed by adding a second water amount with the colloidal silica solution may contribute to the effectiveness of the flocced bonding system.

Further, the colloidal silica of the ceramic compound may also act as an adhesive. As discussed in greater detail below, the ceramic preform of the present application may include one or more liners or inserts at least partially adhered to one or more surfaces of the preform. The colloidal silica of the ceramic compound may facilitate the adherence of the liner or insert to the ceramic preform. Further, greater amounts of water in the ceramic compound (e.g., between about 41 and 65 wt % water) may increase the adhesiveness of the ceramic compound.

The table below shows a ceramic preform compound formulation with typical ranges given for each batch component according to an embodiment of the present application. The viscosity, batch adhesiveness, and moldability of the compound generally changes with the level of water addition. For example, at a low end of water addition (e.g., between about 15 and 40 wt % water), the compound is a moldable batch which develops a ball-in-hand consistency. A ball-in-hand consistency is generally known in the art to represent an empirical determination of the compound's readiness for forming. A handful of material is grabbed and squeezed. If the compound knits together, it is ready to mold. The viscosity of the low end water content material is similar to a common caulking compound and may range between about 5,000,000 and 10,000,000 centipoise. At a high end of water addition (e.g., between about 41 and 65 wt. % water), the compound has a greater fluidity with a viscosity that may range between about 250,000 and 1,500,000 centipoise. It can be appreciated that the water level content influences the consistency and ease of moldability of the ceramic preform compound and the method that is used to form a ceramic preform.

| Component | Weight Percentage, Wt % |
|---|---|
| Silicon Carbide Particles, 360 grit | 20 to 55 |
| Refractory Fiber | 4.5 to 15 |
| Burnout Material | 2.5 to 8 |
| Flaked Cationic Starch | 1 to 6 |
| Methyl Cellulose | 1 to 2.5 |
| Colloidal silica | 3.5 to 6.5 |
| Water | 15 to 65 |

Figure 2:
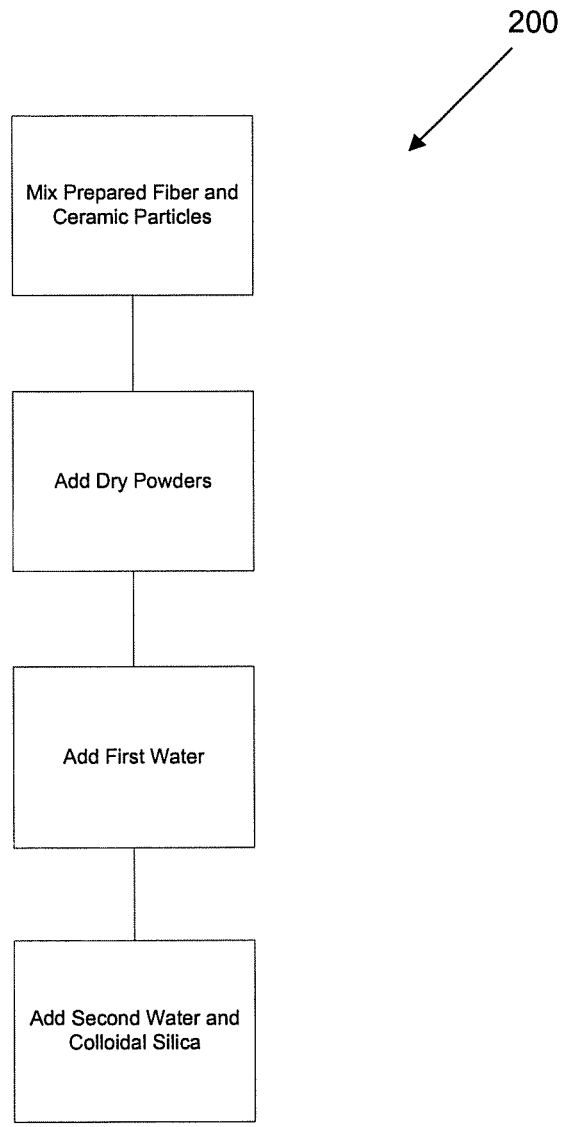
FIG. 2 illustrates a method of making a ceramic compound according to an embodiment of the present application.

FIG. 2 illustrates a method 200 of preparing a ceramic preform compound according to an embodiment of the present application. As shown, the method 200 comprises the step of mixing the prepared fibers with the ceramic particles. For example, in certain embodiments, silicon carbide particles may be dry mixed with a refractory fiber, such as an aluminosilicate refractory fiber, in a Hobart mixer or other suitable mixer for a period of time (e.g., less than 20 minutes).

As illustrated in FIG. 2, dry powders, such as, for example, a burnout material, starch, and binder, are added and mixed with the prepared fiber and ceramic particles. For example, in certain embodiments, the silicon carbide particles and aluminosilicate refractory fiber are dry mixed with walnut shell four, starch, and methyl cellulose in a tumble mixer or other suitable mixer for a period of time (e.g., approximately 30 minutes). A US Stoneware Roller Mill, Model 755, with an enclosed cylindrical container may be used for this dry mix tumbling step. The dry tumble mixed powders may then be added back into the Hobart mixer.

As illustrated in FIG. 2, the addition of water to the mixture is generally divided into two parts, a first water addition and a second water addition. In certain embodiments, the total amount of first water added to the mixture is between about 50 and about 200 grams depending on the size of the preform ceramic compound batch. During the first water addition, the majority of the first water is added and the mixture is mixed for a period of time (e.g., approximately 22 minutes). After mixing, the remainder of the first water is added and mixing continues for an additional period of time (e.g., approximately 3 minutes). This amount of wet mixing time (e.g., approximately 25 minutes) insures that the starch is completely wetted out in the batch. During the second water addition, a certain amount of water (e.g., between about 7 wt % and about 10 wt % of the batch composition) is mixed with the colloidal silica solution and is added into the Hobart mixer and mixed for a period of time (e.g., approximately 1-2 minutes). As such, the batch clumps together and is ready to mold into a ceramic preform.

Figure 4A:
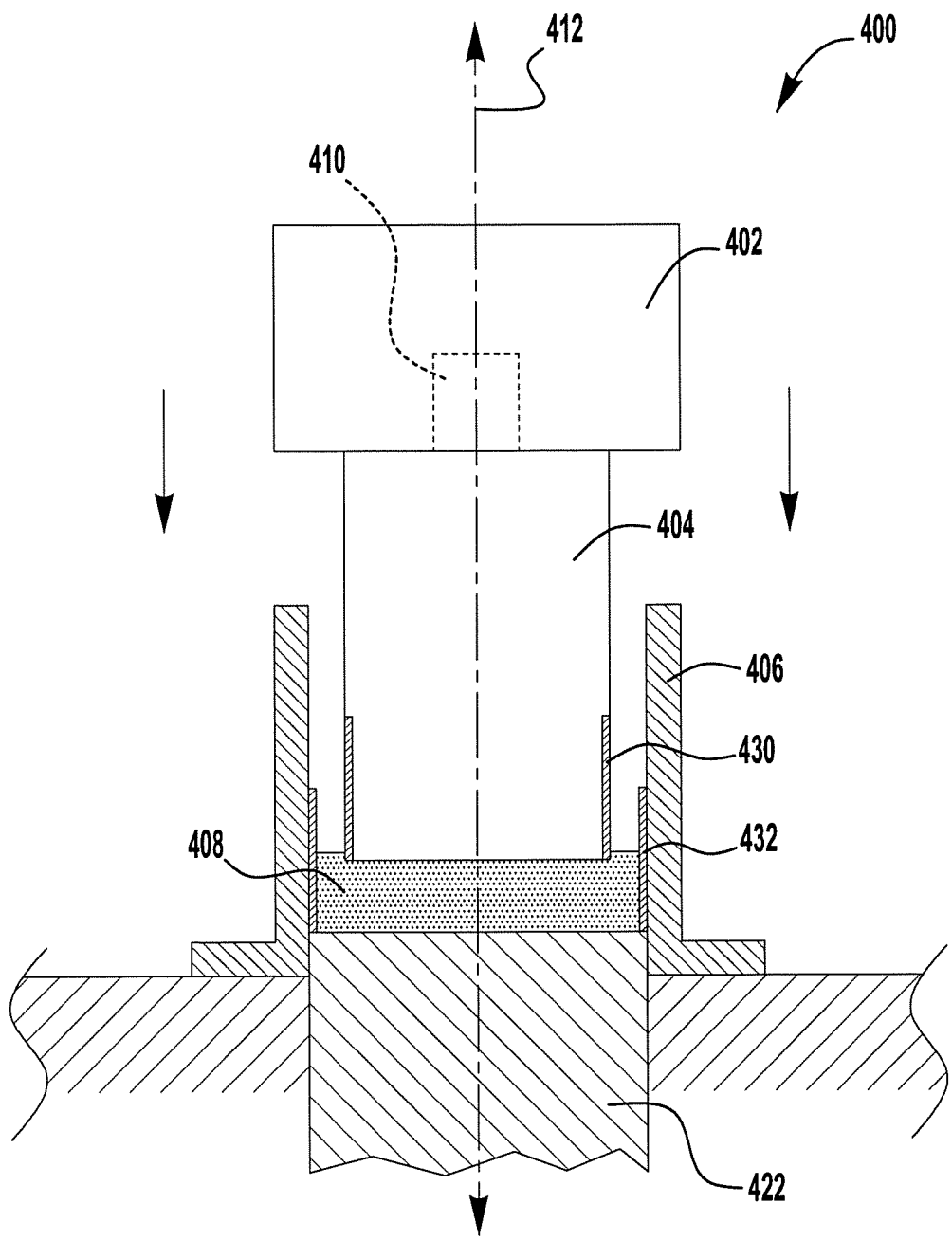
FIGS. 4A-4C illustrate a compression molding apparatus according to an embodiment of the present application, wherein the apparatus is shown forming a ceramic preform of the present application.
Figure 4B:
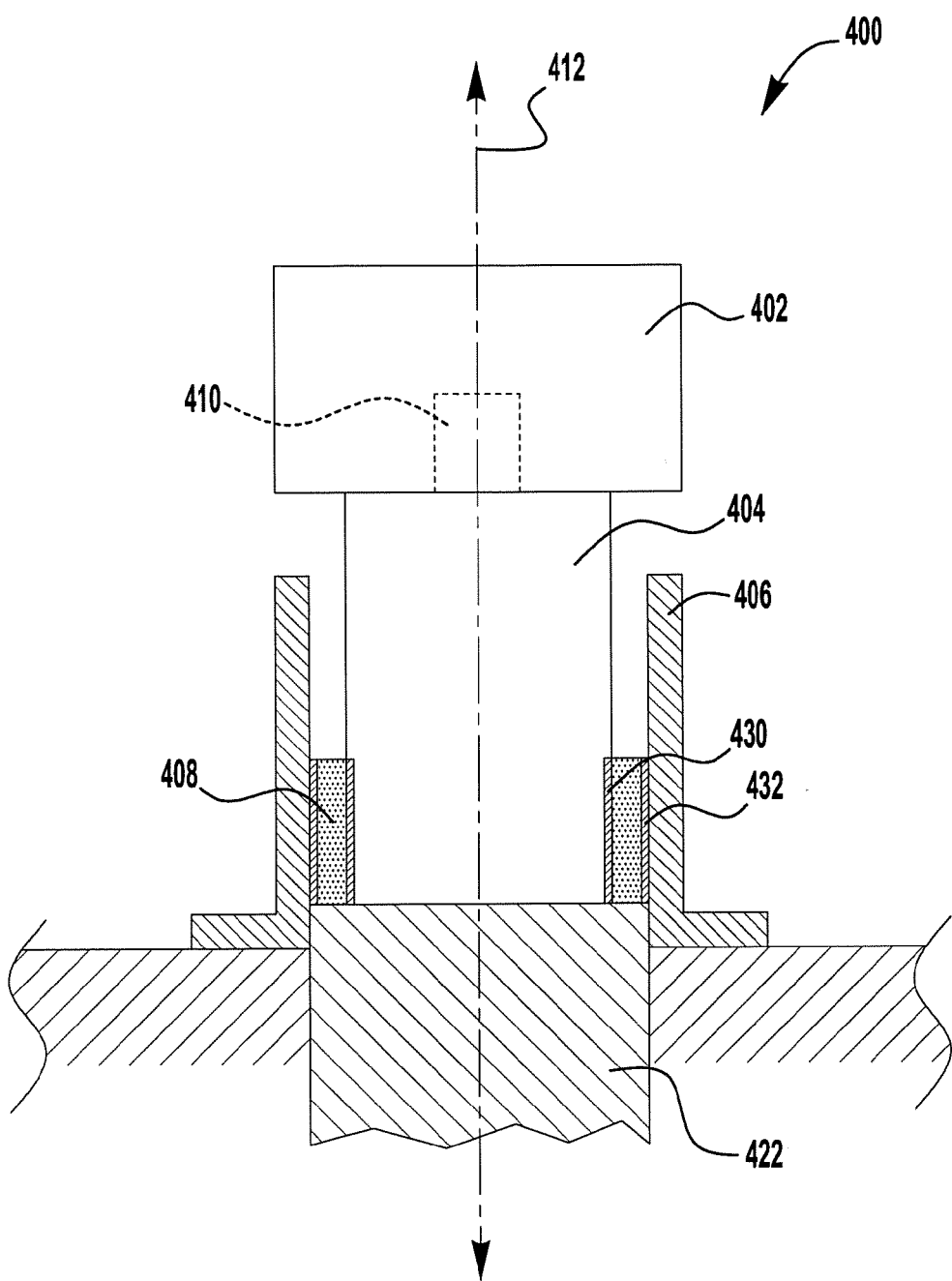
Figure 4C:
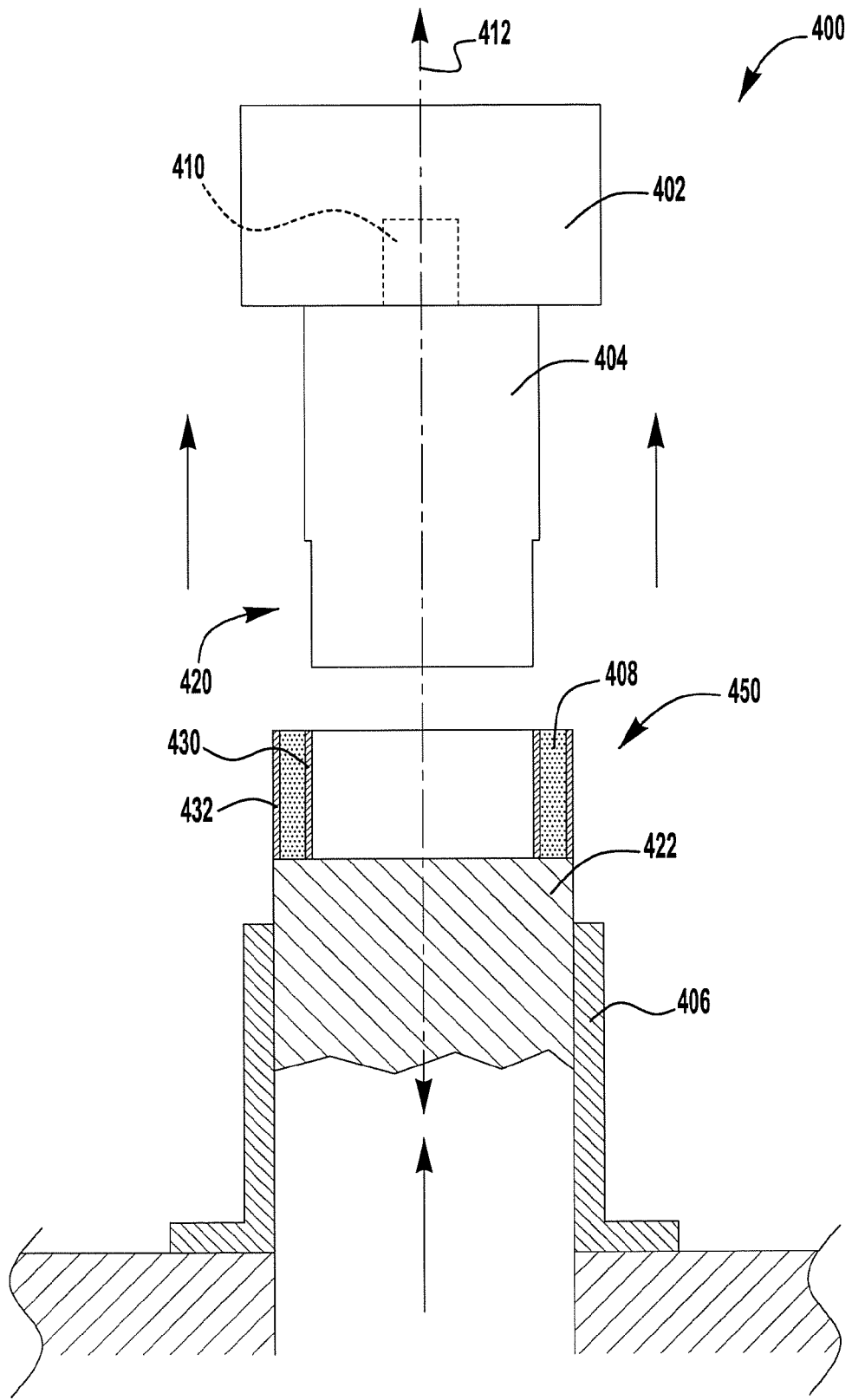

The ceramic compound may be molded using a compression molding apparatus to form a ceramic preform of the present application. FIGS. 4A-4C illustrate a compression molding apparatus 400 according to an embodiment of the present application. As shown, the compression molding apparatus 400 comprises a ram 402, a first or male die portion 404, and a second or female die portion 406. A ceramic compound 408 is placed in the female die portion 406 and compressed by the male die portion 404 to form the ceramic preform 450 (see FIGS. 4C-5B). The pressure for compression will vary depending on the consistency of the ceramic compound 408. For example, in certain embodiments, the pressure may range between about 1 psi for compounds having a light consistency (e.g., higher moisture level) and about 3000 psi for compounds having a heavier consistency (e.g., lower moisture level).

As illustrated in FIGS. 4A-4C, the male die portion 404 is operatively connected to the ram 402 of the compression molding apparatus 400. As shown, the apparatus 400 comprises a motor 410, e.g., a hydraulic or electric motor, configured to selectively rotate at least a part of the male die portion 404 relative to the ram 402. For example, the motor 410 may be configured to rotate the male die portion 404 about its longitudinal axis 412 and clockwise, counterclockwise, and/or at various speeds relative to the ram 402. Further, the ram 402 may comprise a thrust bearing or similar component that permits the male die portion 404 to move and rotate when significant pressure is applied to the male die portion. In certain embodiments, however, the male die portion 404 may not be configured to rotate relative to the ram 402.

As illustrated in FIGS. 4A and 4B, the ceramic compound 408 is placed in the bottom of the female die portion 406 and the ram 402 moves the male die portion 404 downward. The ceramic compound 408 moves or is pushed upward in the female die portion 406 as the male die portion 404 moves downward. As illustrated in FIG. 4B, the ceramic compound 408 fills the void between the male die portion 404 and the female die portion 406 as the male die portion moves downward. In certain embodiments, the male die portion 404 contacts the bottom of the female die portion 406 such that the ceramic compound 408 forms a cylindrical ceramic preform 450 (see, e.g., FIGS. 4C-5B). In other embodiments, the male die portion 404 stops a selected distance above the bottom of the female die portion 406 such that the ceramic compound 408 forms a cylindrical ceramic preform having a closed end or bottom (i.e., a cup shaped ceramic preform) (see, e.g., the ceramic preform 600 shown in FIG. 6).

As illustrated in FIG. 4C, once the ceramic preform 450 is formed, the male die portion 404 retracts and an ejector 422 pushes the ceramic preform out of the compression molding apparatus 400. As shown, the ejector 422 forms at least a portion of the bottom of the female die portion 406 and ejects the ceramic preform 450 out the top of the female die portion. However, the ejector 422 may be configured in a variety of ways to eject the ceramic preform 450 out the top and/or bottom of the female die portion 406 or compression molding apparatus 400. Further, the ceramic preform 450 may be held within the female die portion 406 for a period of time (e.g., between about ½ hour and about 24 hours) or until it begins to dry to facilitate removal of the ceramic preform from the compression molding apparatus 400.

In certain embodiments, the male die portion 404 may spin or rotate about its longitudinal axis 412 and relative to the female die portion 406 as it moves downward to compress the ceramic compound 408. Further, in certain embodiments, the female die portion 406 is configured to rotate or spin about its longitudinal axis 412 and relative to the male die portion 404. As such, the compression molding apparatus 400 may be configured in a variety of ways to form the ceramic preform 450. For example, the compression molding apparatus 400 may be configured such that the male die portion 404 rotates relative to a stationary female die portion 406 during compression of the ceramic compound 408, the female die portion rotates relative to a stationary male die portion during compression of the compound, and/or both the male and female die portions rotate either in the same or opposite direction during compression of the compound to form the ceramic preform 450. The turning of the die portion 404 and 406 facilitates the formation of a smooth uniform surface of the ceramic preform 450. Further, the turning of the die portion 404 and 406 permits the fibers within the ceramic compound 408 to be orientated in a circular fashion to give the ceramic preform 450 greater strength, e.g., hoop strength.

The compression molding apparatus 400 may comprise one or more liners or inserts on one or both of the male and female die portions 404 and 406. The liners generally adhere to one or more surfaces of the ceramic preform, such as, for example, the inner diameter, outer diameter, and/or bottom of the ceramic preform. The liners provide support and rigidity to the ceramic preform during removal of the part from the compression molding apparatus 400 and subsequent processing of the part. As such, the liners help the ceramic preform maintain its shape through the drying stage and subsequent processing steps described herein.

The liners also facilitate removal of the ceramic preform from the die male and female portions 404 and 406. For example, during compression without the liners, the ceramic compound 408 will attach or adhere to the die portions 404 and 406. However, when the liners are positioned between the ceramic compound 408 and the die portions 404 and 406, the compound will attach or adhere to the liners and not the die portions. Further, the liners may be coated with substances that facilitate removal of the ceramic preform from the die portions 404 and 406. For example, low viscosity oils, mold release agents, wax, silicon lubricants or the like may be used facilitate removal of the ceramic preform.

The liners are also configured to facilitate drying of the ceramic preform. The liners are generally porous and absorbent to permit removal of moisture from the ceramic preform. The absorbency of the liner helps to draw the moisture from the ceramic preform before burning the organics out of the preform. For example, in certain embodiments, the liner permits removal of between about 25 wt % and about 75 wt % of moisture from the ceramic preform body. Further, the liners may be capable of being burned off the ceramic preform during subsequent processing of the part. In certain embodiments, the liner may be porous to permit the flow of moisture from the ceramic preform.

The liners may comprise a variety of materials, such as, for example, a non-woven material, paper, cardboard such as a cardboard tube or core, matte of aluminosilicate fiber, metal screen, or combinations thereof. Further, the liners may comprise reinforcing fibers that add strength and rigidity to the liner and the ceramic preform. The liners may also be a variety of shapes and sizes, and may be configured to adhere to virtually any surface of the ceramic preform. For example, in certain embodiments, the liners are shaped as cardboard tubes or cylinders that adhere to the inner and outer surfaces of the ceramic preform and have a thickness between about 0.003 inch and about 0.25 inch.

As illustrated in FIGS. 4A-4C, a first liner 430 shaped as a cylindrical tube is disposed about one end of the male die portion 404. As shown, the first liner 430 is received within a recessed portion 420 (see FIG. 4C) of the male die portion 404 to prohibit movement of the first liner as the male die portion moves downward and compresses the ceramic compound 408. Further, a second liner 432 shaped as a cylindrical tube is received within the female die portion 406. As illustrated in FIGS. 4C-5B, the first and second liners 430 and 432 adhere to the inner diameter surface and the outer diameter surface, respectively, of the ceramic preform 450.

In certain embodiments, a third liner may be received within the female die portion 406 such that the third liner at least partially adheres to the bottom of the ceramic preform. FIG. 6 illustrates a ceramic preform 600 according to an embodiment of the present application. As shown, the ceramic preform 600 comprises a first liner 630 adhered to inner diameter surface, a second liner 632 adhered to the outer diameter surface, and a third liner 634 adhered to the exterior closed end or bottom of the part. However, it should be understood that more or less liners may be used and/or may be shaped and configured to adhere to any surface of the ceramic preform, including the top and interior bottom of the part.

In certain embodiments, the ceramic preform of the present application may comprise a metal core on its inner diameter and/or outer diameter to provide additional support during the low temperature drying phase. The metal core(s) is generally removed prior to firing the ceramic preform in the furnace.

Figure 5A:
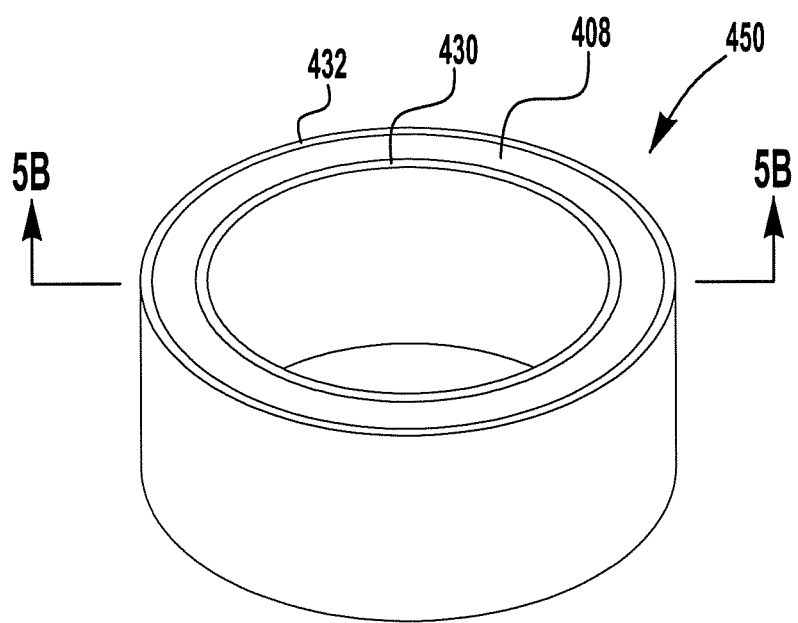
FIGS. 5A and 5B are perspective and cross sectional views, respectively, of a ceramic preform according to an embodiment of the present application.
Figure 5B:
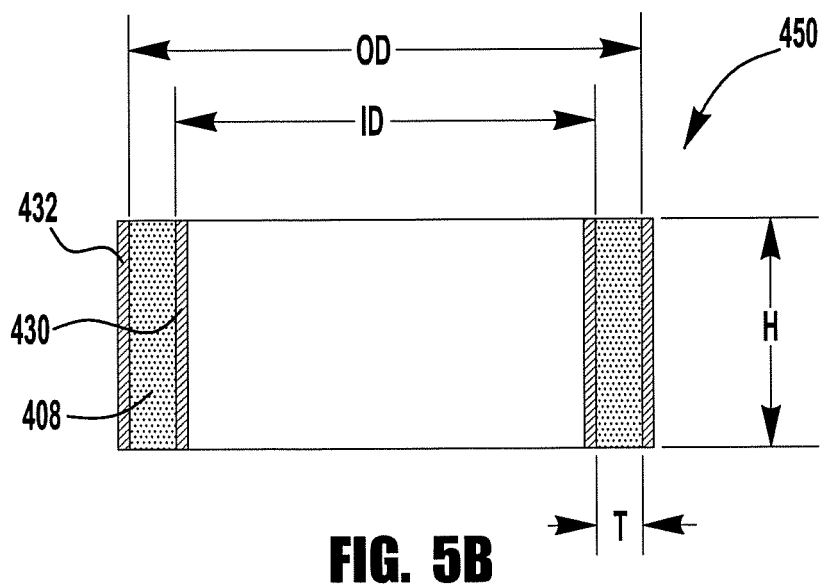

As illustrated in FIGS. 5A and 5B, the ceramic preform 450 is formed as a hollow circular cylinder with a prescribed wall thickness T. As shown, the wall of the cylinder is substantially perpendicular to the top and bottom of the cylinder. However, in certain embodiments, the wall of the cylinder is slightly tapered (e.g., tapers from about ¼ degree to about 2 degrees) to facilitate removal of the ceramic preform 450 from the die portions. In certain embodiments, the ceramic preform 450 comprises an inner diameter ID between about 3 inches and about 8 inches; an outer diameter OD between about 5 inches and about 20 inches; a wall height H between about 3 inches and about 10 inches; and a wall thickness T between about ¼ inch and about 2 inches. As described in greater detail below, the ceramic preform 450 may be infiltrated with a metal, such as, for example, aluminum, magnesium, titanium, or copper, and form at least a portion of a brake drum.

The inner diameter, outer diameter, wall height, and wall thickness dimensions of the cup shaped ceramic preform 600 illustrated in FIG. 6 are generally similar to the ceramic preform 450 shown in FIGS. 5A and 5B and described above. In certain embodiments, the wall of the cylinder is slightly tapered (e.g., tapers from about ¼ degree to about 2 degrees) to facilitate removal of the ceramic preform 600 from the die portions. Further, the ceramic preform 600 may also be infiltrated with metal and form at least a portion of a brake drum. The closed end or bottom 650 of the ceramic preform 600 may or may not be removed during subsequent processing of the part. For example, the bottom 650 (or at least a portion of the bottom) may provide added strength and rigidity to the ceramic preform 600 during subsequent processing of the part (e.g., during drying and heat treatment). The bottom 650, or portion thereof, may be removed to form an open ended cylinder before forming the MMC.

Figure 9A:
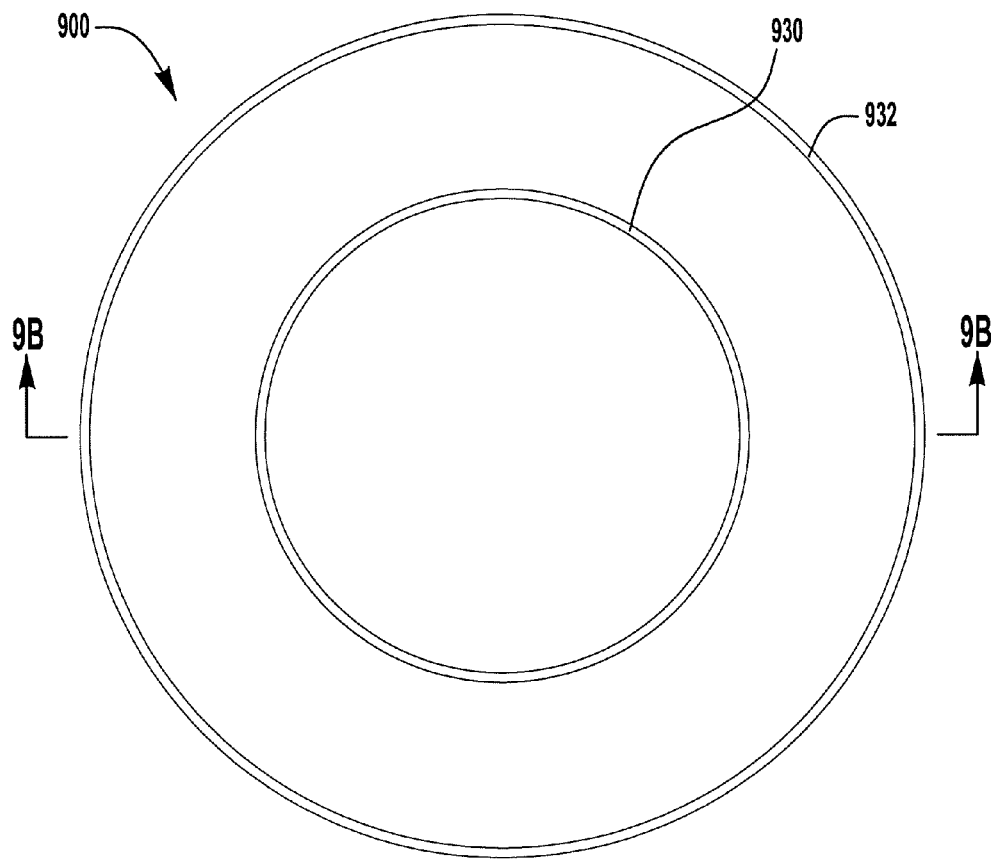
FIGS. 9A and 9B are top and cross sectional views, respectively, of a ceramic preform according to an embodiment of the present application.
Figure 9B:
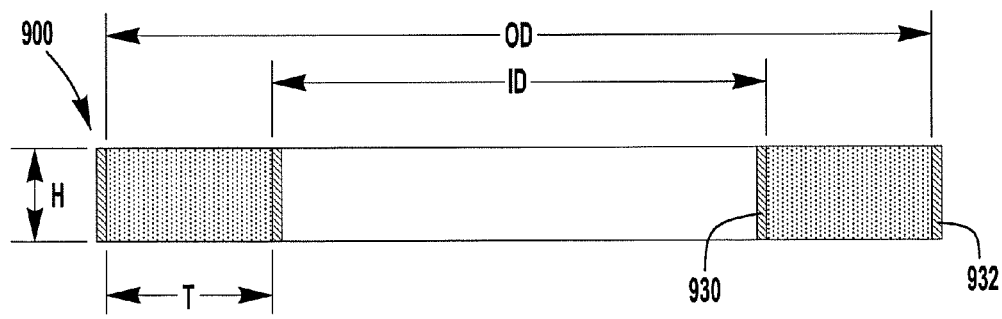

FIGS. 9A and 9B illustrate a ceramic preform 900 according to an embodiment of the present application. As shown, the ceramic preform 900 is shaped as a disc. In certain embodiments, the ceramic preform 900 comprises an inner diameter ID between about 4 inches and about 10 inches; an outer diameter OD between about 8 inches and about 14 inches; a wall height H between about ¼ inch and about 2 inches; and a wall thickness T between about 1 inch and about 5 inches. The ceramic preform 900 may be infiltrated with a metal, such as, for example, aluminum, magnesium, titanium, or copper, and form at least a portion of a rotor or brake disc. For example, one or more ceramic preform 900 may be used to form the exterior braking surface of the rotor or brake disc. As illustrated in FIGS. 9A and 9B, liners 930 and 932 are adhered to the inner and outer surfaces, respectively, of the ceramic preform 900.

Figure 8A:
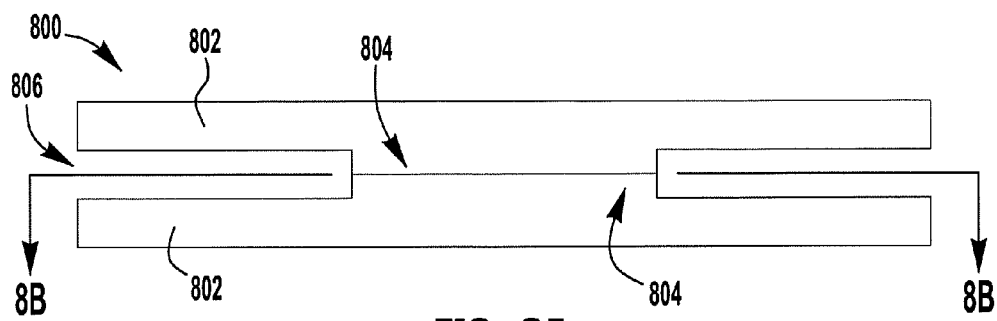
FIG. 8A is a side view of a metal matrix composite brake disc according to an embodiment of the present application.

The male and female die portions 404 and 406 of the compression molding apparatus 400 may be sized and shaped in a variety of ways to form a variety of different ceramic preforms. For example, the male and/or the female die portion 404 and 406 may comprise features such as raised or recessed portions that form corresponding features in the ceramic preform, such as, for example, a raised portion extending from the main body of the part or a recessed portion in the main body of the part. In certain embodiments, the male and female die portions 404 and 406 are configured to form a disc shaped ceramic preform having a raised circular center portion. For example, FIG. 8A illustrates a side view of a MMC brake disc 800 formed using two disc shaped ceramic preforms having raised center portions. As shown, the raised center portions are arranged adjacent to each other to provide a channel 806 between the exterior braking surfaces of the brake disc 800 and facilitate cooling of the disc brakes.

The methods and apparatuses for forming a ceramic preform described herein provide a dimensionally stable part. For example, the height and thickness of the ceramic preform cylindrical wall is maintained throughout drying, binder burnout and high temperature firing steps discussed below. The ceramic preform does not slump or deform during these subsequent processing steps. The ratio of wall height to wall thickness of the ceramic preform is generally between about 5:1 and about 25:1. In certain embodiments, the ratio of wall height to wall thickness of the ceramic preform is approximately 7:1. Further, the ceramic preform substantially maintains its circular or round shape when removed from the molding apparatus and during the subsequent processing steps. For example, the tolerance of the diameter of the ceramic preform is generally within less than 0.1 inch around the circumference of the part. The methods and apparatuses for forming a ceramic preform described herein also permit the part to have a prescribed wall thickness of 1½ inches or less when the part is released from the mold.

The methods and apparatuses for forming a ceramic preform described herein also permit the ceramic preform to be made rapidly, such as, for example, more than 1 preform/ minute per machine, more than 2 preforms/minute per machine, more than 3 preforms/minute per machine, or at least 3 preforms/minute per machine. As such, these methods and apparatuses provide for the rapid production of ceramic preforms at higher volumes than conventional processes. Further, the ceramic preforms produced by the methods and apparatuses described herein have a greater stiffness than ceramic preforms made by conventional processes.

Figure 3A:
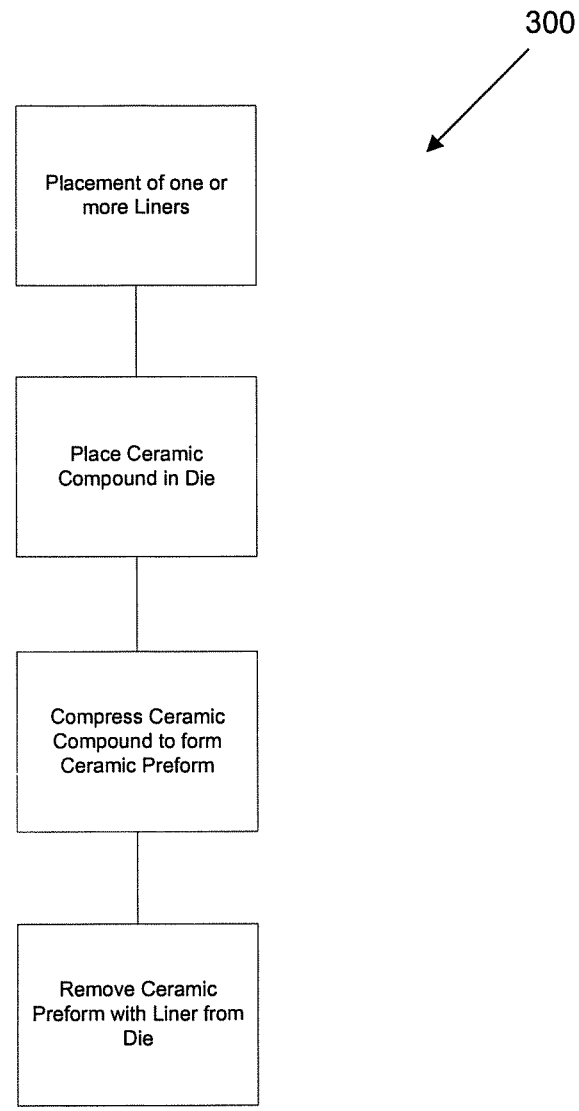
FIG. 3A illustrates a method of forming a ceramic preform according to an embodiment of the present application.

FIG. 3A illustrates an exemplary method 300 of forming a ceramic preform that includes placing one or more liners on the male die portion and/or in the female die portion of the compression molding apparatus. A ceramic compound is placed in the female die portion of the compression molding apparatus. The ceramic compound is compressed with the male die portion to form a ceramic preform of the present application. The ceramic preform is removed from the female die portion with the one or more liners attached to the ceramic preform. In certain embodiments, the male die portion and/or the female die portion of the compression molding apparatus is rotated during compression of the ceramic compound.

Figure 3B:
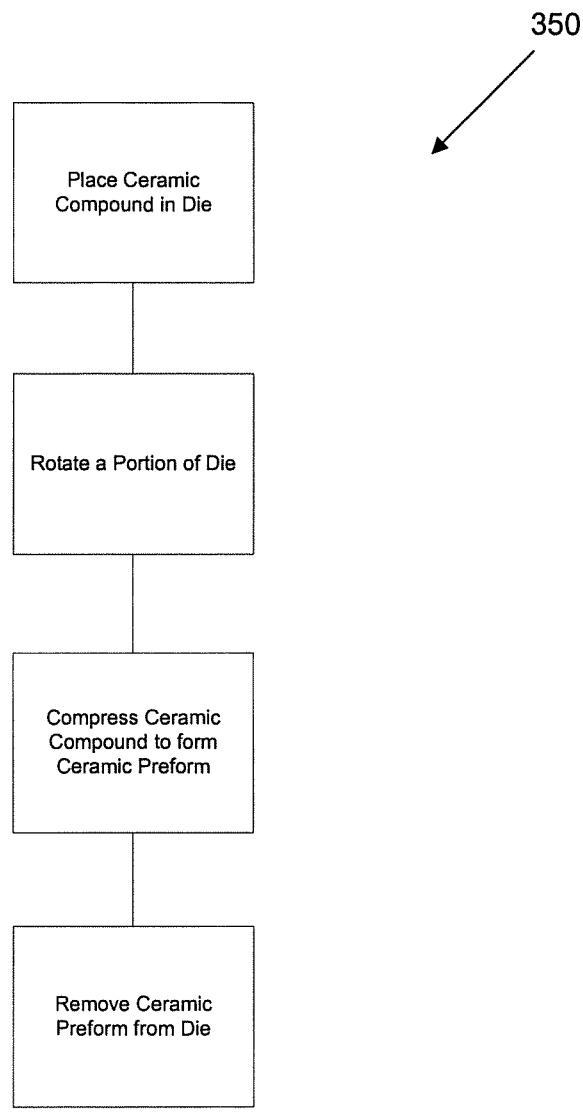
FIG. 3B illustrates a method of forming a ceramic preform according to an embodiment of the present application.

FIG. 3B illustrates an exemplary method 350 of forming a ceramic preform that includes placing a ceramic preform in the female die portion of the compression molding apparatus. The male die portion and/or the female die portion of the compression molding apparatus is rotated and the ceramic compound is compressed with the male die portion to form a ceramic preform of the present application. The ceramic preform is removed from the female die portion. In certain embodiments, one or more liners are placed on the male die portion and/or in the female die portion of the compression molding apparatus and the ceramic preform is removed from the female die portion with the one or more liners attached to the ceramic preform.

Another exemplary method of forming a ceramic preform includes using a compression molding apparatus to compress the ceramic compound without rotating the male or female die portions of the apparatus. For example, in certain embodiments, male and female mold halves are closed on a press. The sidewalls of the female mold have approximately a 2 degree taper to facilitate removal of the ceramic preform from the mold after forming. The ceramic compound is introduced into the female mold and inserts or liners may or may not be used on the circumference of the female mold, the bottom surface of the female mold, and/or the outer surface of the male mold. The male mold is placed on top of the ceramic compound in the female mold. The mold assembly is placed in a press. Pressure is slowly applied such that the ceramic compound begins to move up the sidewalls to the male mold top plate until the batch flash comes out of the parting line between the male top plate and the female mold. The male and female mold halves are substantially closed. After the batch flash stops moving, the pressure is maintained for a period of time (e.g., approximately 30 seconds) and the mold assembly is released from the press. The male mold is removed leaving the ceramic preform in the female mold. The ceramic preform is dried in the female mold. The ceramic preform is released from the female mold. In certain embodiments, the ceramic preform is cup-shaped with tapered side walls. The cup-shaped ceramic preform goes through the further process steps of binder burnout and high temperature firing described below. Further, the bottom of the ceramic preform may or may not be removed to form an open-ended cylinder.

As illustrated in FIG. 1, after the ceramic preform is released from the compression molding apparatus, the ceramic preform goes through the further process steps of drying, binder burnout, and heat treatment. The ceramic preform is generally dried in the drying oven at a certain temperature (e.g., about 60 degrees C. or about 140 degrees F.) for a period of time. The length of the oven drying time will often vary based on the water content of the ceramic preform, the size of the part and, if one or more liners are used, the rate at which the water permeates through the liners. A ceramic preform is generally considered dry when the weight loss is between about 20 and about 70 wt % due to the removal of water from the part.

During the binder burnout step illustrated in FIG. 1, a low temperature heat treatment is conducted to remove the organics or volatile components from the ceramic preform. In certain embodiments, these organics include the walnut shell flour, the starch, and the methyl cellulose. The low temperature heat treatment cycle is generally an approximately 1 hour ramp to a certain temperature (e.g., about 260 degrees C. or about 500 degrees F.) with an approximately two hour hold at about the same temperature. A high temperature heat treatment is conducted to seal the ceramic bond created by the colloidal silica. The high temperature heat treatment generally has a hold at a certain temperature (e.g., about 985 degrees C. or about 1800 degrees F.) for approximately two hours. In certain embodiments, after the high temperature heat treatment, the colloidal silica particles remain in the ceramic preform and the ceramic preform comprises silicon carbide particles, refractory fiber and silica bond. In these embodiments, the burnout materials, starch, methyl cellulose, and (if used) the liners are all removed from the porous ceramic preform body after the low and high temperature heat treatments.

The ceramic preform of the present application may be infiltrated with a metal, such as, for example, aluminum, magnesium, titanium, or copper, to form a MMC of the present application. For example, the ceramic preform may be introduced into a die-casting mold for infiltration of metals that are capable of being die cast, such as, for example, aluminum, magnesium, or copper, to form a MMC of the present application.

A high pressure die cast mold generally includes two die parts: a first die part that is generally stationary and coupled to a non-moving platen of the die casting machine and a second die part that is movable relative to the first die part and is generally coupled to a movable platen of the die casting machine. Within each die part is a mold cavity that receives the injected molten metal. The mold cavity is representative of the final product shape with calculated shrink factored in and draft added to aid in part release. In certain embodiments, the amount of shrinkage is between about 0.07% and about 2.19%. The cavity also generally includes a nesting area that accepts and locates the ceramic preform within the mold cavity.

The first die part or stationary part generally includes a pathway for molten metal to travel to fill the mold, a piston type shot tip that moves the molten metal into the mold, and an ejection system that aids ejecting the finished casting after solidification. Further, the second die part of moving part generally has a vacuum system to facilitate evacuation of air trapped within the mold cavity after the ceramic preform is placed therein and the mold is closed before the molten metal is injected.

The die parts are typically machined from tool steel with various treatments to improve durability. Heating and cooling circuits may also be added throughout the die parts to aid in attaining and retaining optimum temperatures for the casting process. These circuits may use various fluids to transfer temperatures into or out of predetermined areas of the die and are typically placed close to the mold cavity but do not enter the cavity.

The ceramic preform is placed within the mold cavity of the die cast mold. The ceramic preform may be preheated to a certain temperature prior to introduction into the mold cavity. For example, the ceramic preform may be preheated to a temperature that is above the temperature of the molten metal that is being injected into the mold cavity (e.g., aluminum). In certain embodiments, the ceramic preform is heated to at least 50 degrees F. above the temperature of the molten metal that is being injected into the mold cavity. In other embodiments, the ceramic preform is heated to at least 100 degrees F. above the temperature of the molten metal that is being injected into the mold cavity. Molten metal is then injected into the mold cavity at a low velocity and infiltrates the porous body of the ceramic preform. The velocity of the molten metal is such that the ceramic preform does not deform during injection of the molten metal. The molten metal infiltrates substantially through the entire wall thickness. Further, in certain embodiments, the molten metal infiltrates substantially through a ceramic preform having a wall thickness of 1½ inches or less.

FIG. 7 illustrates a side cross sectional view of a MMC brake drum 700 according to an embodiment of the present application. As shown, a cylindrical ceramic preform 702 of the present application forms at least a portion of the braking surface of the brake drum 700. The ceramic preform 702 was infiltrated with a metal (e.g., aluminum) to form the MMC brake drum 700, such as during a die casting process as discussed herein.

The ceramic preform 702 and MMC brake drum 700 may be a variety of sizes and shapes for a variety of different vehicles. For example, in certain embodiments, the MMC brake drum 700 may be configured for use with a large truck or military vehicle, e.g., with vehicles having brake drums about 16½ inches in diameter $D_1$ and either about 5 inches or about 7 inches deep $D_2$. In these embodiments, the inner diameter of the cylindrical ceramic preform 702 may be between about 12 inches and about 17 inches and the preform may weigh between about 10 lbs. and about 15 lbs. Further, the wall thickness of the cylindrical ceramic preform 702 may be between about ½ inch and about 1½ inches or more and the wall height may be between about 4 inches and about 8 inches. In certain embodiments, the ratio of the height of the cylindrical wall and the wall thickness of the ceramic preform 702 for a brake drum is between about 5:1 to about 12:1, or about 7:1 in one exemplary embodiment. In certain embodiments, the MMC brake drum 700 is greater than about 10 inches in diameter and greater than about 1 inch deep.

Figure 8B:
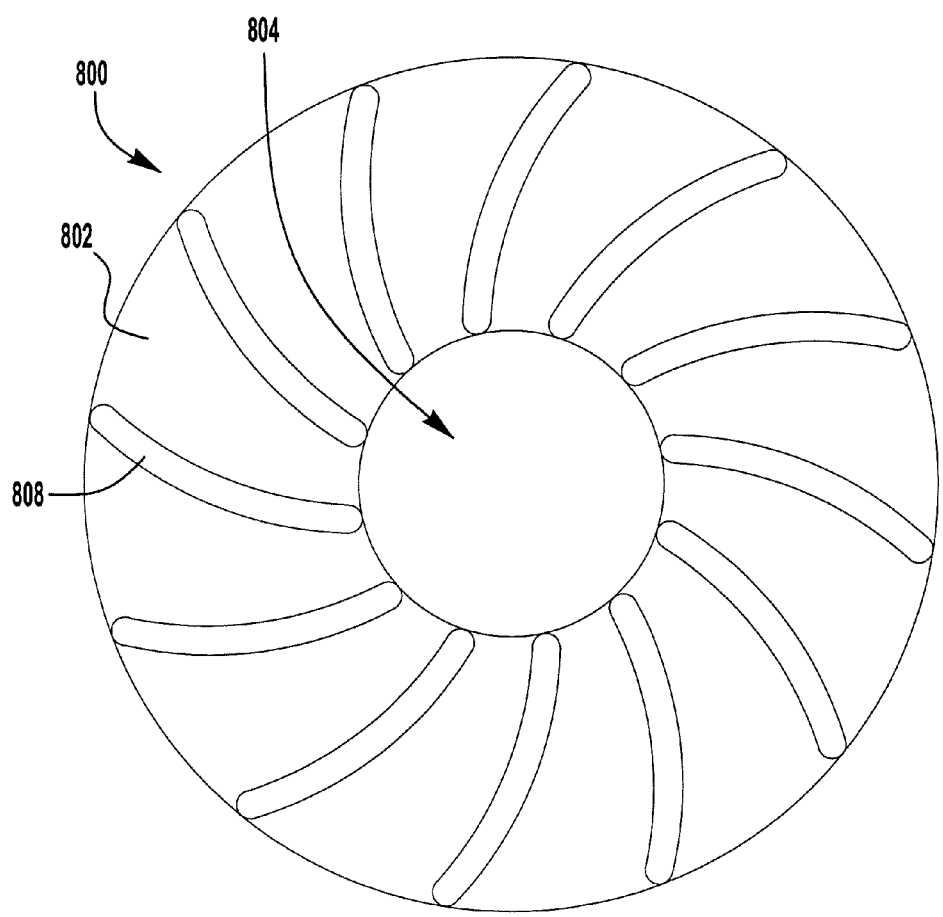
FIG. 8B is a cross sectional view of the metal matrix composite brake disc of FIG. 8A taken along line 8B-8B.

FIGS. 8A and 8B illustrate a MMC brake disc 800 according to an embodiment of the present application. The brake disc comprises two MMC discs 802 having raised center portions 804. As shown, the center portions 804 are arranged adjacent to each other to provide a channel 806 between the exterior braking surfaces of the brake disc. The channel 806 facilitates cooling of the disc brakes. Further, as illustrated in FIG. 8B, each MMC disc 802 may comprise raised portions 808 that the form vanes to facilitate airflow and cooling of the disc brakes as the brake disc 800 rotates.

As discussed above, each MMC disc 802 is formed using a disc shaped ceramic preform having approximately the same shape as the MMC disc. Each ceramic preform was infiltrated with a metal (e.g., aluminum) to form the MMC disc 802, such as during a die casting process as discussed herein. The ceramic preform and MMC brake disc 800 may be a variety of sizes and shapes for a variety of different vehicles. For example, in certain embodiments, the MMC brake disc 800 is between about 9 inches and about 16 inches in diameter and between about 1 inch and about 1½ inches thick.

As an example, a cylindrically cup-shaped ceramic preform with a bottom was made using a two-part mold having a female receptacle that formed the outside surface of the part and a male insert that defined the inner wall surface of the ceramic part. A preform ceramic compound was introduced into the mold. The ceramic compound was a high viscosity, low water content ceramic preform compound formulation and was made by combining 47.63 wt % Silicon Carbide 360 grit particles (Washington Mills Carborex 360), 9.53 wt % hammermilled and sieved aluminosilicate refractory fiber (Morgan Thermal Ceramics Cerafiber HM6), 5.4 wt % walnut shell flour –100 mesh (Echo-Shell, Inc.), 3.63 wt % flaked cationic corn starch (Wesbond Westar +3), 1.77 wt % hydroxypropyl methyl cellulose (Dow Chemical Methocel™ A4M), 11.3 wt. % of first water addition, 9.64 wt % of second water addition and 11.1 wt. % colloidal silica solution (Wesbond Bindzil® 1440). The mold was pressed in a conventional press to a static pressure sufficient to move the ceramic compound up the sidewalls of the mold to form the sidewalls of the part. The sidewalls of the mold were tapered approximately 2° to permit easy release of the part from the mold. The mold from which the ceramic part was made was approximately 4 inches tall with an outer diameter at the top of about 5¼ inches and an outer diameter at the base of about 5 inches. The wall thickness of the mold was about 0.4 inch. The bottom wall thickness of the mold was about ¼ inch. The weight of the ceramic part after all processing steps, including drying, low temperature firing and high temperature firing, was about 520 grams, or 518.4 grams. The composition of the final part was 77.3 wt % Silicon Carbide, 15.5 wt. % aluminosilicate refractory fiber, and 7.2 wt % silicate binder.

As an example, a cylindrically cup-shaped ceramic preform with a bottom was made using a compression molding apparatus. A preform ceramic compound was made and introduced into the mold. The ceramic compound was a low viscosity, high water content ceramic preform compound formulation and was made by combining 35.25 wt % Silicon Carbide 360 grit particles (Washington Mills Carborex 360), 7.07 wt % hammermilled and sieved aluminosilicate refractory fiber (Morgan Thermal Ceramics Cerafiber HM6), 3.99 wt % walnut shell flour –100 mesh (Echo-Shell, Inc.), 2.19 wt % flaked cationic corn starch (Wesbond Westar +3), 1.41 wt % hydroxypropyl methyl cellulose (Dow Chemical Methocel™ A4M), 35.25 wt. % of first water addition, 9.26 wt % of second water addition and 11.1 wt. % colloidal silica solution (Wesbond Bindzil® 1440). The male top portion of the die was rotated while applying a gentle downward force. The preform ceramic compound was pushed upwards to form the sidewalls of the cylinder. The ceramic part was dried, fired for binder burnout, and fired at high temperature. The resulting finished part had a weight of approximately 280 grams, or 280.8 grams. The height of the ceramic preform sidewall and the sidewall thickness were 98.53 mm and 8.95 mm respectively for a height to thickness ratio of about 11:1. The composition of the final part was 79.1 wt % SiC, 15.9 wt. % aluminosilicate refractory fiber and 5.0 wt % silicate binder.

As an example, a cylindrically cup-shaped ceramic preform with a bottom was made using a compression molding apparatus. The mold was lined on the outside wall surface and the bottom with cardboard. After drying, the ceramic part released easily from the metal mold with the cardboard adhering to the ceramic part. After drying of the cardboard encased ceramic part, the part weight was 250.5 grams. The height of the ceramic preform wall was 97.73 mm and the wall thickness was 9.63 mm for a wall height to thickness ratio of about 10:1.

As an example, a ceramic preform nominally measuring 4 in.×4 in.×1 in. was infiltrated with molten aluminum to make an aluminum MMC. The ceramic preform was made with preform ceramic compound of the present application. The surface of the preform was sanded on one large area side. The ceramic preform which had been preheated to an elevated temperature was introduced into a die-casting mold. Aluminum alloy 380 was infiltrated into the ceramic preform by squeeze-casting. The metal infiltration through the highly porous ceramic preform occurred through the thickness of the preform to a depth of 0.962 to 0.978 inches.

In certain embodiments, a method of making a ceramic preform used in the manufacture of a metal matrix composite brake drum, disc brake rotor, or component thereof comprises utilizing a compression molding apparatus having a male die portion and a female die portion. At least one of the male die portion and the female die portion are configured to rotate relative to the other die portion and about its longitudinal axis. At least a portion of an inner surface of the female die portion is lined with a first porous and absorbent liner such that at least a portion of the first liner attaches to an outer diameter of the ceramic preform and facilitates removal of the ceramic preform from the female die portion. At least a portion of an outer surface of the male die portion is lined with a second porous and absorbent liner such that at least a portion of the second liner attaches to an inner diameter of the ceramic preform and facilitates removal of the ceramic preform from the male die portion. A ceramic compound is placed in the female die portion. The ceramic compound comprises between about 20 Wt % and about 55 Wt % ceramic particles; between about 4.5 Wt % and about 15 Wt % reinforcing fibers; between about 2.5 Wt % and about 8 Wt % fugitive porosity generating component; between about 1 Wt % and about 6 Wt % starch; between about 1 Wt % and about 2.5 Wt % low temperature organic binder; between about 3.5 Wt % and about 6.5 Wt % colloidal silica; and between about 15 Wt % and about 65 Wt % water. The ceramic compound is compressed with the male die portion to form the ceramic preform. At least one of the male die portion and the female die portion rotates relative to the other die portion and about its longitudinal axis during compression of the ceramic compound. The ratio of wall height to wall thickness of the ceramic preform is between about 5:1 and about 25:1. The ceramic preform is removed from the compression molding apparatus. The first liner is attached to the outer diameter of the ceramic preform and the second liner is attached to the inner diameter of the ceramic preform. The ceramic preform is dried in an oven until the weight loss percentage due to the removal of the water from the ceramic preform is between about 20 percent and about 70 percent. The ceramic preform is heat treated at a temperature sufficient to remove the fugitive porosity generating component, starch, and low temperature organic binder from the ceramic preform. The ceramic preform is heat treated at a temperature sufficient to seal the ceramic bond created by the colloidal silica. The first liner and the second liner are removed from the ceramic preform during heat treatment. The method may also comprise mixing the components of the ceramic compound, brushing the reinforcing fibers off a ceramic fiber paper, and adding the brushed reinforcing fibers to the ceramic compound.

In certain embodiments, a method of making a metal matrix composite brake drum, disc brake rotor, or component thereof comprises the steps described above for making a ceramic preform. Further, the ceramic preform is preheated to a certain temperature and then placed in a mold cavity of a high pressure die cast mold. Molten metal is injected into the mold cavity such that the metal infiltrates substantially through the entire wall thickness of the ceramic preform.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

We claim:

1. A method of making a metal matrix composite brake component, comprising the steps of:
utilizing a compression molding apparatus having a first die portion having a first molding surface and a second die portion having a second molding surface;
placing one or more porous liners on at least one of the first molding surface and second molding surface;
placing a ceramic compound in the second die portion;
compressing the ceramic compound with the first die portion to form a ceramic preform having the one or more liners disposed on an external surface of the ceramic preform;
removing the ceramic preform from the compression molding apparatus, wherein the one or more porous liners are attached to the external surface of the ceramic preform;
infiltrating the ceramic preform with molten metal to form the metal matrix composite brake component;
wherein the ceramic compound comprises ceramic particles, reinforcing fibers, organic materials, and water;
wherein the one or more liners are shaped as cylindrical tubes;

wherein the ceramic preform is formed as a cylinder, and the external surface comprises an inner diameter surface and an outer diameter surface; and wherein the one or more porous liners are absorbent and draw moisture away from the external surface of the ceramic preform, maintain the shape of the ceramic preform, and are capable of being burned off of the ceramic preform during heat treatment of the ceramic preform.

2. The method of claim 1, wherein the one or more porous liners comprise a first liner and a second liner, the first die portion is a male die portion, and the second die portion is a female die portion, and wherein the first liner is shaped as a cylindrical tube and is disposed about one end of the male die portion and the second liner is shaped as a cylindrical tube and is received within the female die portion.

3. The method of claim 2, wherein the first liner at least partially adheres to the inner diameter surface of the ceramic preform and the second liner at least partially adheres to the outer diameter surface of the ceramic preform.

4. The method of claim 3, wherein the first liner and the second liner comprise cardboard.

5. The method of claim 1 further comprising rotating at least one of the male die portion and the female die portion about its longitudinal axis and relative to the other of the male die portion and the female die portion during compression of the ceramic compound.

6. A method of making a metal matrix composite brake component, comprising the steps of:
utilizing a compression molding apparatus having a male die portion having a male molding surface and a female die portion having a female molding surface;
placing first and second cardboard liners on the male and female molding surfaces, wherein the first cardboard liner is shaped as a cylindrical tube and is disposed about one end of the male die portion and the second cardboard liner is shaped as a cylindrical tube and is received within the female die portion;
placing a ceramic compound in the female die portion;
compressing the ceramic compound with the male die portion to form a ceramic preform, wherein the ceramic preform is formed as a cylinder having an inner diameter and an outer diameter, the first cardboard liner is disposed on an inner diameter surface of the ceramic preform, and the second cardboard liner is disposed on an outer diameter surface of the ceramic preform;
removing the ceramic preform from the compression molding apparatus, wherein the first and second cardboard liners are attached to the inner and outer diameter surfaces of the ceramic preform; and
infiltrating the ceramic preform with molten metal to form the metal matrix composite brake component;
wherein the ceramic compound comprises ceramic particles, reinforcing fibers, organic materials, and water; and
wherein the first cardboard liner is absorbent and draws moisture away from the inner diameter surface of the ceramic preform, the second cardboard liner is absorbent and draws moisture away from the outer diameter surface of the ceramic preform, the first and second cardboard liners maintain the shape of the ceramic preform, and are capable of being burned off of the ceramic preform during heat treatment of the ceramic preform.

7. The method of claim 6, wherein the male die portion is rotating about its longitudinal axis and relative to the female die portion during compression of the ceramic compound.

8. The method of claim 1, wherein the one or more porous liners are non-ceramic.

9. The method of claim 1, wherein the one or more porous liners are formed of cardboard.

10. The method of claim 1, wherein the metal matrix composite brake component is a brake drum.

11. The method of claim 6, wherein the metal matrix composite brake component is a brake drum.

12. The method of claim 1, wherein the one or more porous liners comprise a first liner and a second liner, and the first liner at least partially adheres to the inner diameter surface of the ceramic preform and the second liner at least partially adheres to the outer diameter surface of the ceramic preform.

13. A method of making a ceramic preform for a metal matrix composite brake component, comprising the steps of:
utilizing a compression molding apparatus having a first die portion having a first molding surface and a second die portion having a second molding surface;
placing one or more porous liners on at least one of the first molding surface and second molding surface;
placing a ceramic compound in the second die portion;
compressing the ceramic compound with the first die portion to form a ceramic preform having the one or more liners disposed on an external surface of the ceramic preform;
removing the ceramic preform from the compression molding apparatus, wherein the one or more porous liners are attached to the external surface of the ceramic preform; and
wherein the ceramic compound comprises ceramic particles, reinforcing fibers, organic materials, and water;
wherein the one or more liners are shaped as cylindrical tubes; and
wherein the one or more porous liners are absorbent and draw moisture away from the external surface of the ceramic preform, maintain the shape of the ceramic preform, and are capable of being burned off of the ceramic preform during heat treatment of the ceramic preform.

14. The method of claim 13, wherein the one or more porous liners are formed of cardboard.

15. The method of claim 13, wherein the one or more porous liners are non-ceramic.

16. The method of claim 13, wherein:
the ceramic preform is formed as a cylinder, and the external surface comprises an inner diameter surface and an outer diameter surface;
the one or more porous liners comprise a first liner and a second liner; and
the first liner at least partially adheres to the inner diameter surface of the ceramic preform and the second liner at least partially adheres to the outer diameter surface of the ceramic preform.

17. The method of claim 13, wherein the metal matrix composite brake component is a brake drum.

\* \* \* \* \*